(12) United States Patent
Gao

(10) Patent No.: US 11,127,203 B2
(45) Date of Patent: Sep. 21, 2021

(54) LEVERAGING CROWDSOURCED DATA FOR LOCALIZATION AND MAPPING WITHIN AN ENVIRONMENT

(71) Applicant: Samsung Electronics Co., Ltd., Suwon Si (KR)

(72) Inventor: Jiang Gao, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/385,424

(22) Filed: Apr. 16, 2019

(65) Prior Publication Data

US 2019/0355173 A1 Nov. 21, 2019

Related U.S. Application Data

(60) Provisional application No. 62/672,346, filed on May 16, 2018.

(51) Int. Cl.
| | |
|---|---|
| *G06T 17/05* | (2011.01) |
| *G06T 7/73* | (2017.01) |
| *G06T 19/00* | (2011.01) |
| *G06T 7/50* | (2017.01) |
| *G01C 21/30* | (2006.01) |

(52) U.S. Cl.
CPC ............ *G06T 17/05* (2013.01); *G01C 21/30* (2013.01); *G06T 7/50* (2017.01); *G06T 7/74* (2017.01); *G06T 19/003* (2013.01); *G06T 2200/04* (2013.01); *G06T 2200/24* (2013.01); *G06T 2207/10028* (2013.01); *G06T 2219/2004* (2013.01)

(58) Field of Classification Search
CPC ......... G06T 2207/10028; G06T 19/006; G06T 7/70; G06K 9/00201; G06K 9/00671; G06F 3/011
See application file for complete search history.

(56) References Cited

U.S. PATENT DOCUMENTS

| | | | | |
|---|---|---|---|---|
| 8,705,893 | B1 * | 4/2014 | Zhang | G06K 9/00201 |
| | | | | 345/418 |
| 10,060,857 | B1 * | 8/2018 | Bouchard | B25J 9/0096 |
| 10,217,120 | B1 * | 2/2019 | Shin | G06Q 30/0201 |
| 10,579,875 | B2 * | 3/2020 | Dal Mutto | G06K 9/00201 |
| 10,795,022 | B2 * | 10/2020 | Shintani | H04N 13/254 |

(Continued)

*Primary Examiner* — Abderrahim Merouan

(57) ABSTRACT

Described is a system for leveraging crowd sourced data for mapping and navigation within a spatial environment. The system may merge various map fragments received from multiple devices to create a global 3D point cloud map. The system may also provide the ability to identify real-world virtual landmarks in an environment and associate these virtual coordinates with locations within the 3D point cloud map. These virtual landmarks may then be used to reference and index objects detected within the environment. Accordingly, these virtual landmarks and objects may then be used for mapping and navigation. For example, the objects may be referenced by various devices in real time for re-localization, and the virtual landmarks maybe used by various devices to triangulate accurate positions. Accordingly, described is an efficient mechanism for leveraging crowd sourced data to improve navigation within a spatial environment.

20 Claims, 10 Drawing Sheets

(56) References Cited

U.S. PATENT DOCUMENTS

| | | | |
|---|---|---|---|
| 2010/0283781 A1* | 11/2010 | Kriveshko | G06T 17/00 345/419 |
| 2012/0054276 A1* | 3/2012 | Chaturvedi | H04L 67/1061 709/204 |
| 2014/0307252 A1* | 10/2014 | Hinderling | G02B 26/004 356/141.4 |
| 2014/0368651 A1* | 12/2014 | Irschara | G06T 7/80 348/148 |
| 2015/0170416 A1* | 6/2015 | McGregor | G06T 15/80 345/420 |
| 2015/0206023 A1* | 7/2015 | Kochi | G06T 15/20 382/199 |
| 2015/0371431 A1* | 12/2015 | Korb | G06K 9/00208 382/113 |
| 2016/0073104 A1* | 3/2016 | Hillebrand | G01B 11/245 348/47 |
| 2016/0150042 A1* | 5/2016 | Pattison | H04W 4/21 709/203 |
| 2017/0280133 A1* | 9/2017 | Niemela | H04N 13/257 |
| 2017/0308070 A1* | 10/2017 | Elazary | G05B 19/41865 |
| 2017/0372527 A1* | 12/2017 | Murali | G01S 17/48 |
| 2018/0047288 A1* | 2/2018 | Cordell | G06K 9/66 |
| 2018/0189611 A1* | 7/2018 | Dal Mutto | G06K 9/00201 |
| 2018/0239343 A1* | 8/2018 | Voorhies | G05D 1/0234 |
| 2018/0246529 A1* | 8/2018 | Hu | G05D 1/0202 |
| 2018/0313956 A1* | 11/2018 | Rzeszutek | G01S 17/87 |
| 2018/0322623 A1* | 11/2018 | Memo | G06N 3/084 |
| 2019/0287311 A1* | 9/2019 | Bhatnagar | G06F 3/017 |
| 2019/0378344 A1* | 12/2019 | Long | A61C 13/0004 |
| 2020/0080849 A1* | 3/2020 | Ondruska | G06T 7/246 |
| 2020/0111222 A1* | 4/2020 | Asmari | G06T 7/579 |
| 2020/0225673 A1* | 7/2020 | Ebrahimi Afrouzi | A47L 9/2857 |

* cited by examiner

LEVERAGING CROWDSOURCED DATA FOR LOCALIZATION AND MAPPING WITHIN AN ENVIRONMENT

CROSS-REFERENCE TO RELATED APPLICATIONS

This application claims the benefit of U.S. Provisional patent application having the Application No. 62/672,346, filed on May 16, 2018, and titled "Method and System for Crowd Source Based Localization and Navigation" by Jiang Gao, which is incorporated by reference herein in its entirety.

TECHNICAL FIELD

This disclosure relates to robotic navigation within a spatial environment, and more particularly, processing crowdsourced information to improve mapping and navigation within the spatial environment.

BACKGROUND

Three-dimensional map creation is a research field that can help mobile robots perform various tasks. When navigating an environment, robots rely on various techniques to understand their spatial environment. For example, within an unknown environment, a robot may be equipped with one or more sensors to acquire environmental information and estimate its position and orientation. Based on this information, the robot can create a map of its surroundings. Creating such three-dimensional maps is a research field that provides many challenges. In addition, current techniques are often developed for individual robots, and therefore, are often ill-suited for handling multiple data streams. Accordingly, there exists a continued need to leverage the additional benefits of crowd sourced information when providing frameworks for three-dimensional spatial models.

SUMMARY

In some embodiments, described is a system (and method, and computer program product) for leveraging crowd sourced data for mapping and navigation within a spatial environment. In some embodiments, the system may receive a first input signal captured by a first device navigating an environment and a second input signal captured by a second device navigating the environment. The system may generate a first three-dimensional (3D) point cloud map from the first input signal and a second three-dimensional (3D) point cloud map from the second input signal. Accordingly, the system may determine the first 3D point cloud map overlaps with the second 3D point cloud map and merge the first 3D point cloud map with the second 3D point cloud map.

In addition, in some embodiments, the system may also identify a location captured by the first device within the environment as a virtual landmark, and associate a physical location in the environment with a location within the first 3D point cloud map for the virtual landmark. In some embodiments, the system may localize the first device using a triangulation calculation including at least the virtual landmark. The system may also identify an object captured by the first device within the environment, and index the object based on a position relative to the virtual landmark. The system may also associate the first 3D point cloud map with the environment by associating a physical location of the environment with a location within the 3D point cloud map to create a virtual coordinate. In addition, in some embodiments, the system may calibrate the first device to align the first 3D point cloud map with the environment by performing one or more movements of the first device along one or more axes within a three-dimensional space.

In addition, in some embodiments, the system may use a merged map to provide navigation functionality to devices. For example, the system may receive a request for a 3D point cloud map from a third device, and provide the merged 3D point cloud map to the third device in response to determining a device identifier of the third device is associated with the merged 3D point cloud map. The system may also receive information specifying a first navigation waypoint for the first device, and share the first navigation waypoint as part of providing the merged 3D point cloud map to the third device.

It should be noted that this Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
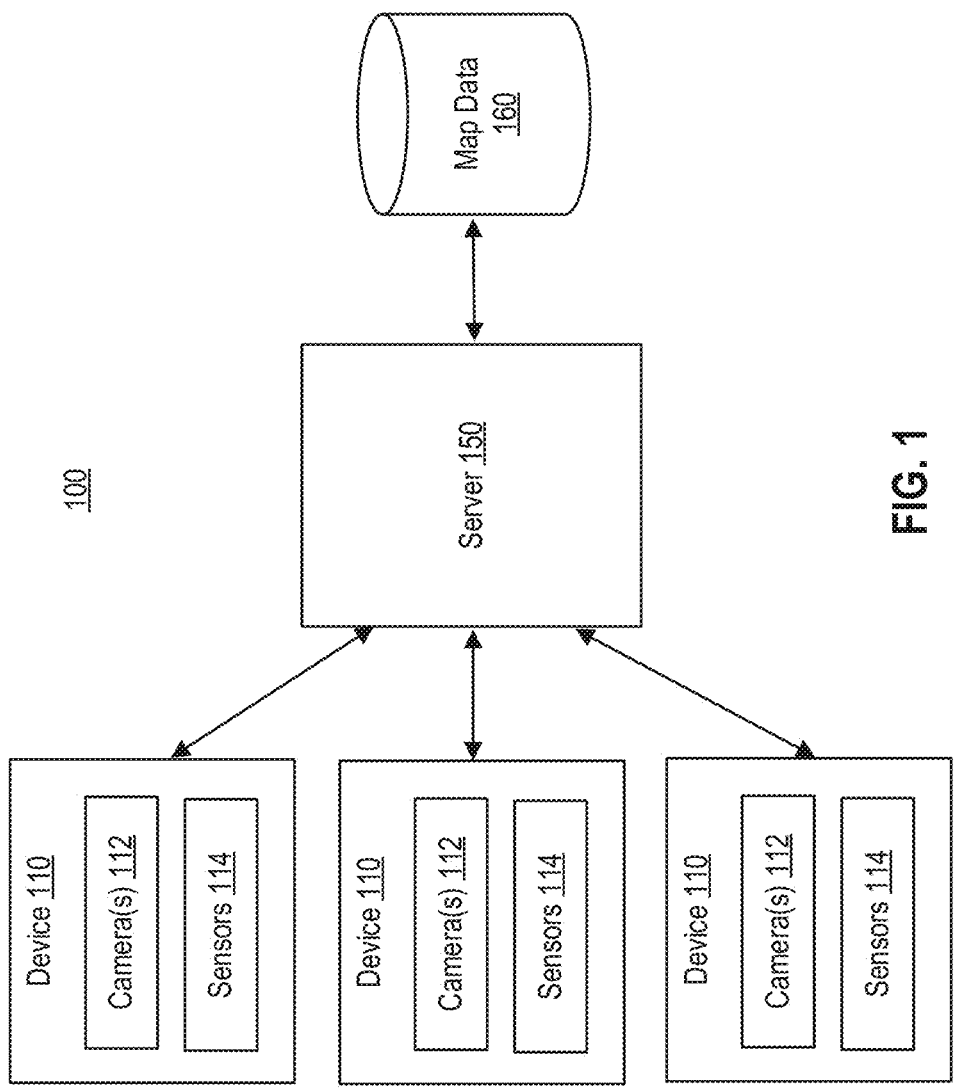
FIG. 1 is a block diagram illustrating an example overview of an operating environment for leveraging crowdsourced data for localization and mapping within an environment according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for leveraging crowd sourced data for mapping and navigation within a spatial environment. In one aspect, the system may generate 3D point cloud maps from crowd sourced data including merging various map fragments. For example, the system may receive multiple maps from multiple devices simultaneously and determine whether such maps overlap. In response to detecting an overlap of maps, the system may merge the maps to create a global map. Accordingly, such a global map may be subsequently relied upon by various types of devices. In another aspect, the system may perform various processes to associate a real world environment with a 3D point cloud map. For example, the system may perform an alignment between the real world environment and a generated 3D point map. In another aspect, the system provides the ability to identify virtual landmarks within the real world and associate (e.g. label) these virtual landmarks within the 3D point cloud map. These virtual landmarks may be used to reference and index objects within the 3D point cloud map. Accordingly, these virtual landmarks and objects may then be used for mapping and navigation. For example, the virtual landmarks may act as navigation waypoints that may be shared across various devices. In addition, the virtual landmarks may be referenced by various devices in real time for re-localization.

Accordingly, aspects of the system provide functionality that is not available in current augmented reality (AR) frameworks (e.g. AR kits). For example, current AR kits are not optimized for 3D point cloud map generation, management, and reuse within across a suite of devices. Accordingly, described is an efficient mechanism for leveraging crowd sourced data to improve navigation within a particular environment. Such a mechanism may be implemented within an operating environment.

FIG. 1 is a block diagram illustrating an example overview of an operating environment 100 for leveraging crowd-sourced data for localization and mapping within an environment according to one or more embodiments of the disclosure.

The operating environment 100 may include one or more devices 110 that communicate with a server(s) 150 via a network. The network may be any type of wired or wireless network including a local area network (LAN), a wide area network (WAN), or a direct communication link, or other suitable connection. The devices 110 may including any type of computing device such as a robot (e.g. robotic vacuum, security robot, etc.), portable device (e.g. smartphone, tablet, laptop, personal digital assistant, etc.), a wearable device (e.g. watch, headwear, etc.), personal computer, or any other type of computing device (e.g. a device that has processing capabilities). The devices 110 may include components for capturing an image such as a camera(s) 112. In addition, the devices 110 may include additional sensors 114 that may be used to determine position and orientation (i.e. pose) information. For example, the sensors 114 may include accelerometers, gyroscopes, quartz sensors, micro-electromechanical systems (MEMS) sensors used as linear accelerometers, electronic compass, magnetometers, lasers, sonar components, lidar components, or other motion or position sensing elements. In addition, the devices 110 may include, or be associated with, a user interface that includes various I/O components such as a display. For example, the device may include a touchscreen display (e.g. in the case a portable device such as a tablet) or be associated with (e.g. wirelessly connected) to another computing device (e.g. a robotic vacuum that is wirelessly coupled to a tablet or smartphone that includes a display).

The camera 112 may capture images of an environment (e.g. room, house, building, city block, etc.) from different locations and/or different angles. For example, the camera 112 can generate red, green, and blue (RGB) data for each pixel in each image. The camera 112 can also optionally generate depth data for each pixel in the image (RGB-D). In addition, in some embodiments, other techniques may be used to capture information in response to surveying an environment such as sonar, lidar, laser, or a combination thereof. Accordingly, such information (e.g. images and sensor information) may be provided to the server 150 for processing. In some embodiments, a Simultaneous Localization and Mapping (SLAM) algorithm may be utilized by the device 110 and/or server 150 to create a three-dimensional (3D) point cloud map of the environment from the provided information (e.g. images captured by the camera). For example, the server 110 can compile the received information (e.g. RGB data or RGB-D data) to generate a 3D point cloud map that represents the environment in a three dimensional coordinate system. The server 150 may maintain the 3D point cloud map and update and augment the 3D point cloud as needed. For example, multiple devices 110 may simultaneously navigate a building and capture images from respective cameras of the devices at varying locations within the building, and can upload the captured images to the server 150. The server 150 may then use a SLAM algorithm to form one or more 3D point clouds from the uploaded images. These maps and related information may be stored in a map database 160. The map database 160 may store maps for various environments, including data for various map fragments from different devices, landmarks, objects, and other user-defined information.

As further described herein, the server 150 may perform various processing functions using the received information to improve map generation and navigation for components within the operation environment 100. For example, the server 150 may generate 3D point cloud maps, merge various map fragments, associate virtual real world landmarks to the 3D point cloud maps, perform an alignment between a real world environment (or physical environment) and a generated 3D point cloud map, and index and embed various objects within the maps. Accordingly, the devices 110 may continually retrieve data from the server 150 for mapping and navigation purposes. For example, the devices 110 may retrieve continuously updated (e.g. merged) maps and related data to aid in the navigation of the environment. In addition, the devices 110 may reference various virtual landmarks and objects associated with the 3D point cloud map to navigate within the environment.

As described above, in some implementations, the device 110 may be a portable electronic device (e.g. smart phone, dedicated augmented reality (AR) device, game device, or other device with AR processing and display capabilities). In an AR context, a user may use a device 110 to view a representation of the real world through the display of their device 110. A user may interact with their AR capable device by using their device's camera to receive real world images/video and process the images in a way that superimposes additional or alternate information onto the displayed real world images/video on the device. As a user views an AR implementation on their device 110, real world objects or scenes may be replaced or altered in real time on a display. For example, virtual objects (e.g. text, images, video, etc.) may be inserted into the representation of a scene depicted on a display.

Figure 2:
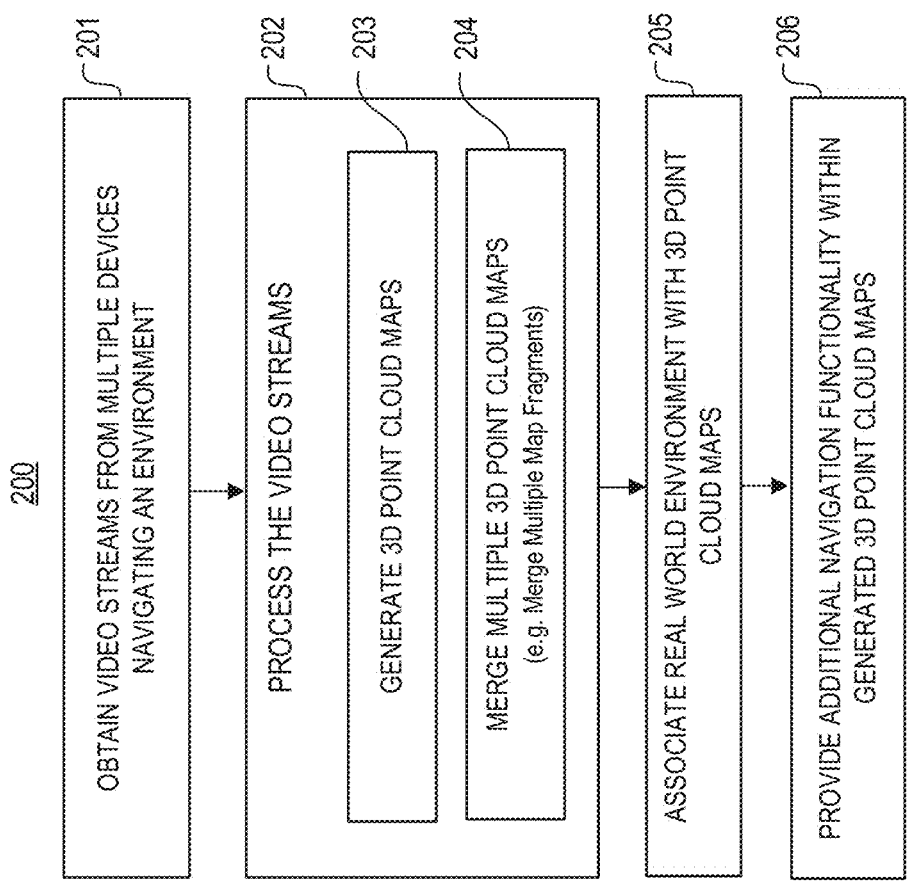
FIG. 2 is a block diagram illustrating an example overview of a process flow for crowdsourcing data to generate 3D point cloud maps according to one or more embodiments of the disclosure.

FIG. 2 is a block diagram illustrating an example overview of a process flow 200 for crowdsourcing data to generate 3D point cloud maps according to one or more embodiments of the disclosure. Process 200 may use processing logic, which may include software, hardware, or a combination thereof. For example, process 200 may be performed by a system including one or more components described in the operating environment 100 (e.g. server 150). Further, although the examples discussed below are directed to embodiments wherein the input signals from the sensors are in the form of video streams from an image capturing device such as a camera, as described above it is contemplated that the input signals may be from sensors that include accelerometers, gyroscopes, quartz sensors, microelectromechanical systems (MEMS) sensors used as linear accelerometers, electronic compass, magnetometers, lasers, sonar components, lidar components, or other motion or position sensing elements. The pose of the camera may be pose of the sensor, and images may be signal maps, or projections of sensed signals.

In 201, the system (e.g. server 150) may obtain sensor information (e.g. video streams and sensor data) from multiple devices. The sensor information may be one or a combination of visual information (e.g. imaging device such as a camera) or direct depth information (e.g. passive stereo or active depth camera), or information from other sensors such as accelerometers, gyroscopes, quartz sensors, microelectromechanical systems (MEMS) sensors used as linear accelerometers, electronic compass, magnetometers, lasers, sonar components, lidar components, or other motion or position sensing elements. In 202, the system may process such information. As described, the system may receive such information at the same time and the system may simultaneously process such information. The system may perform different types and stages of processing.

Figure 3:
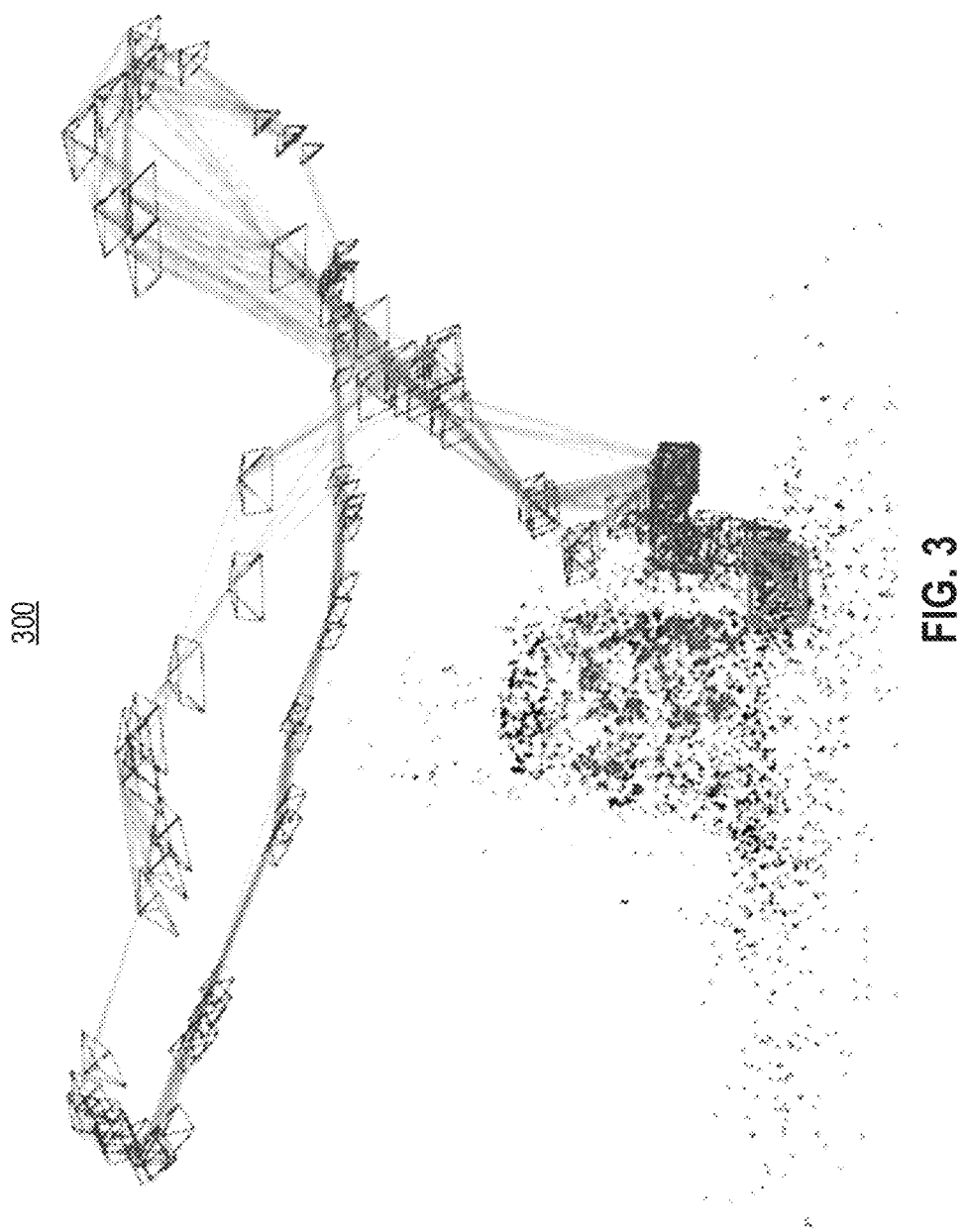
FIG. 3 is an example of a generated 3D point cloud map.

For example, in 203, the system may use a SLAM (including visual SLAM) algorithm to compile the received information and generate 3D point cloud maps that represent the environment in a three-dimensional coordinate system. In one embodiment, SLAM includes the process of calculating the position and orientation of a sensor (e.g. camera) with respect to an environment, while simultaneously building up a map of the environment. In some embodiments, the output from the SLAM algorithm may be a sensor pose (position and orientation) relative to the environment, as well a SLAM Map (e.g. 3D point cloud map). For example, FIG. 3 is a diagram 300 illustrating an example of a 3D point cloud map according to one or more embodiments of the disclosure. As shown in this example, the 3D point cloud map includes the results of the system performing localization from a varying set of positions for a device (e.g. handheld smartphone device).

Returning to FIG. 2, in some embodiments, when generating the 3D point cloud map, the system may perform an analysis on the captured images to identify keyframes and feature points, as well as associations between keyframes and feature points.

Accordingly, as part of the processing, the system may perform keyframe generation. A keyframe may include a captured image and camera parameters (e.g. pose of the camera in a coordinate system) used to produce the image. The system may use information captured from multiple angles to provide localization results within an area that contains many similar features. For example, certain buildings may be visually indistinguishable from certain sensor viewpoints, or a section of a wall may be identical for many buildings. However, upon processing one or more keyframes, the system may reference the map database (e.g. map database 160) to determine a location based on matching keyframes. For instance, an initial keyframe provided by a device may not contain unique or distinguishable information. However, the device may continue to provide information (e.g. relative localization), and the system may continue to receive updated keyframes and continue to attempt a global localization on an incremental basis. As referred to herein, relative localization may refer to determining location and pose of the device, and global localization may refer to determining location and pose within a wide area map (e.g. a merged 3D map stored by the server).

In addition, as part of the processing, the system may perform feature point generation. A feature point (or feature) may include relevant or notable part of an image. The features extracted from an image may represent distinct points along a three-dimensional space (e.g. coordinates on axes X, Y, and Z) and every feature point may have an associated feature location. Accordingly, each feature point may represent a 3D location, and be associated with a surface normal and one or more descriptors. In some embodiments, the system may then reference such keyframes and feature points to perform re-localization and/or loop closing. For example, the system may attempt to match such keyframes and feature points to determine a pose of a particular device by forming 3D-to-3D correspondences.

In some embodiments, as part of the processing, the system may perform re-localization or loop closing. For example, in some embodiments, the system may perform re-localization or loop closing to improve accuracy prior to performing a map merging process as further described herein. In addition, in some embodiments, the system may use loop closing as part of a map merging process. For example, a loop closing algorithm is typically used to determine whether a single device has already traversed a particular area. In some embodiments, however, the system may use such a loop closing algorithm (or modified/specialized loop closing algorithm) to determine whether a particular device has traversed an area previously traversed by a different device. In other words, the system may use a loop closing algorithm to determine whether distinct maps from different devices overlap. In some embodiments, such a loop closing algorithm may be performed at the same time (e.g. simultaneously, concurrently, in parallel, etc.) as the 3D point cloud map generation. For example, the loop closing algorithm used to merge maps may be performed as a background process during real-time map generation.

In 204, the system may merge multiple 3D point cloud maps. As described, the system may receive information from multiple devices at the same time, and accordingly, multiple maps may be generated simultaneously (or in parallel, concurrently, etc.) from information received from various locations. For instance, a first robot may traverse a first room while a second robot traverses a second room at the same time. Accordingly, a merged (or global) map may be generated by the system when it is determined that the paths of the first and second robots have crossed. Accordingly, upon such a determination, the system may merge portions (or segments, fragments, etc.) of the map automatically. In some embodiments, the system may analyze features within images (e.g. keyframes and feature points) to continuously determine if a newly traversed location is near (or overlaps) with the location of an existing map. If it is determined that such a map overlaps with another map, the system may merge such maps as further described herein, for example, with reference to FIG. 8.

As described, by using a 3D point cloud map, a device (e.g. robot) may localize itself within a 3D point cloud map and navigate within a range covered by the map. However, to enable the device to navigate the real-world physical environment, the device may be required to localize itself within the real-world environment and navigate to physical elements.

Accordingly, in 205, the system may associate a real world (or physical) environment with the 3D point cloud map. In some embodiments, the real world environment may be associated with the 3D point cloud map based on user input. For example, a location in the real world environment may be selected (e.g. inputted) by a user touching an element on a device user interface currently displaying a layout of the real world environment. Accordingly, coordinates of the element within the real world environment may correspond to coordinates within the 3D point cloud. Corresponding coordinates may be calculated because the position of the device (and corresponding element within the user interface) are constantly tracked within the 3D point cloud map. These sets of coordinates may then be saved as virtual coordinates. Accordingly, in some embodiments, the virtual coordinates may be comprised of two sets of coordinates including coordinates within the 3D point cloud, and coordinates within the real world (e.g. physical) environment. Accordingly, the system may align the 3D point cloud map to the real world environment using the virtual coordinates. Moreover, these virtual coordinates may be used for cross-device compatibility (e.g. by different types of devices) to eliminate potential variances between devices when mapping coordinates. In some embodiments, these virtual coordinates may be associated with waypoints.

In some embodiments, the virtual coordinates (or waypoints, virtual landmarks, objects, etc.) may be associated with a particular device. Accordingly, when a device attempts to load a 3D point cloud map, virtual coordinates may be obtained using a corresponding device ID and/or a map signature. Accordingly, the system may use specific maps for specific devices, or transform maps collected by another device.

In some embodiments, the system may also associate the real world environment to the 3D point cloud map using virtual landmarks. For example, when virtual landmarks are labeled within the 3D point cloud map, a device may correspondingly be localized within the real world environment. Virtual landmarks may be identified and labeled within the 3D point cloud map using various techniques as further described herein, for example, with reference to FIG. 4.

In addition, in some embodiments, the system may associate real world objects (or elements) with the 3D point cloud map. In some embodiments, the system may leverage virtual landmarks to associate objects within the 3-D point cloud map. For example, when virtual landmarks are associated with the 3D point cloud map, an object may in turn be associated with the 3D cloud map relative to a virtual landmark. An object may be associated with the virtual landmark using various techniques as further described herein, for example, with reference to FIG. 6.

In some embodiments, the system may provide a mechanism for a device (e.g. robot) to perform a calibration. In some embodiments, a user interface may be provided on the device to allow for a user to perform an alignment between the real world environment and a 3D point cloud map. In some embodiments, the calibration may include completing a series of steps (or commands). For example, the system may calibrate the device to align the 3D point cloud map with the environment in response to performing one or more movements of the device along one or more axes within a three-dimensional space. These movements may include rotations and/or translations of the device.

In one embodiment, the calibration may include a user rotating the 3D point cloud along a first calibration axis, and then rotating the 3D point cloud along a second calibration axis. Accordingly, these two rotation inputs allow the system to align the 3D point cloud with physical environment. The system may then calculate a rotation (R), scale (s), and translation (T). The system may then transform both the camera pose (e.g. robot location+pose) and the 3D point clouds in the maps using an (s*RIT) transformation.

In addition, as part of associating a real world environment with the 3D point cloud map, the system may calculate virtual coordinates. For example, the system may calculate device (e.g. robot) trajectories, and by performing the (s*RIT) transformation on the 3D point cloud localization output, the device may position itself in the physical map.

In 206, the system may provide additional navigation functionality within the generated 3D point cloud maps. In some embodiments, when a device is navigating an environment (e.g. using a SLAM algorithm), locations within a 3D point cloud may be mapped to the real world environment using triangulation. For example, the system may localize the device using a triangulation calculation including one or more virtual landmarks. The triangulation calculation may be similar, for example, to techniques used for Wi-Fi triangulation. For example, the system may know the location of elements within the real world (e.g. waypoints, or virtual landmarks) as well as the device position relative to such elements, and accordingly, the system may then infer (e.g. via triangulation) a real world (e.g. physical) location of the device.

In some embodiments, once maps are generated and virtual landmarks and/or objects are associated with the maps, such objects or virtual landmarks may be used to localize a device (e.g. robot) within the local environment or within a global map. In some embodiments, the association of objects with virtual landmarks provides an efficiency in that it reduces the amount of information to be searched in order for the system to perform re-localization. For example, identifying a virtual landmark or recognizing an object may allow the system to perform keyframe analysis on a subset of the map information (e.g. within a vicinity of a particular virtual landmark or object) when performing re-localization.

When navigating an environment, the device may receive updated map information. In some embodiments, the device may load map information from a server. For example, the map database (e.g. map database 160) may store and index map information with particular device identifiers. For example, a map signature or hash value may be associated with particular device IDs. In addition, the devices may be classified based on the type of device. In some embodiments, a particular map may be provided for a particular device or particular type of device. For example, the system may determine a particular map may be suitable for robotic vacuum type devices, but not other types of devices such as a handheld devices. In addition, particular map information may also be provided to certain devices or device types. For example, virtual landmarks, object information, or waypoints that are associated with a robotic vacuum may be provided to another robotic vacuum. Such information, however, may not be transmitted to a user interacting with a smartphone as such information may not be relevant. Accordingly, the system may provide map related information (or meta information) to specific types of devices.

In addition, as part of the navigation functionality, a user may also create virtual landmarks by identifying particular navigation waypoints (or points of interest). For example, a user may provide a user input on a user interface (e.g. touchscreen) specifying a waypoint which is recorded (e.g. embedded into a map) allowing the device to navigate to the waypoint in the future. As described, various waypoints may then be shared amongst various types of devices as virtual landmarks.

Figure 4:
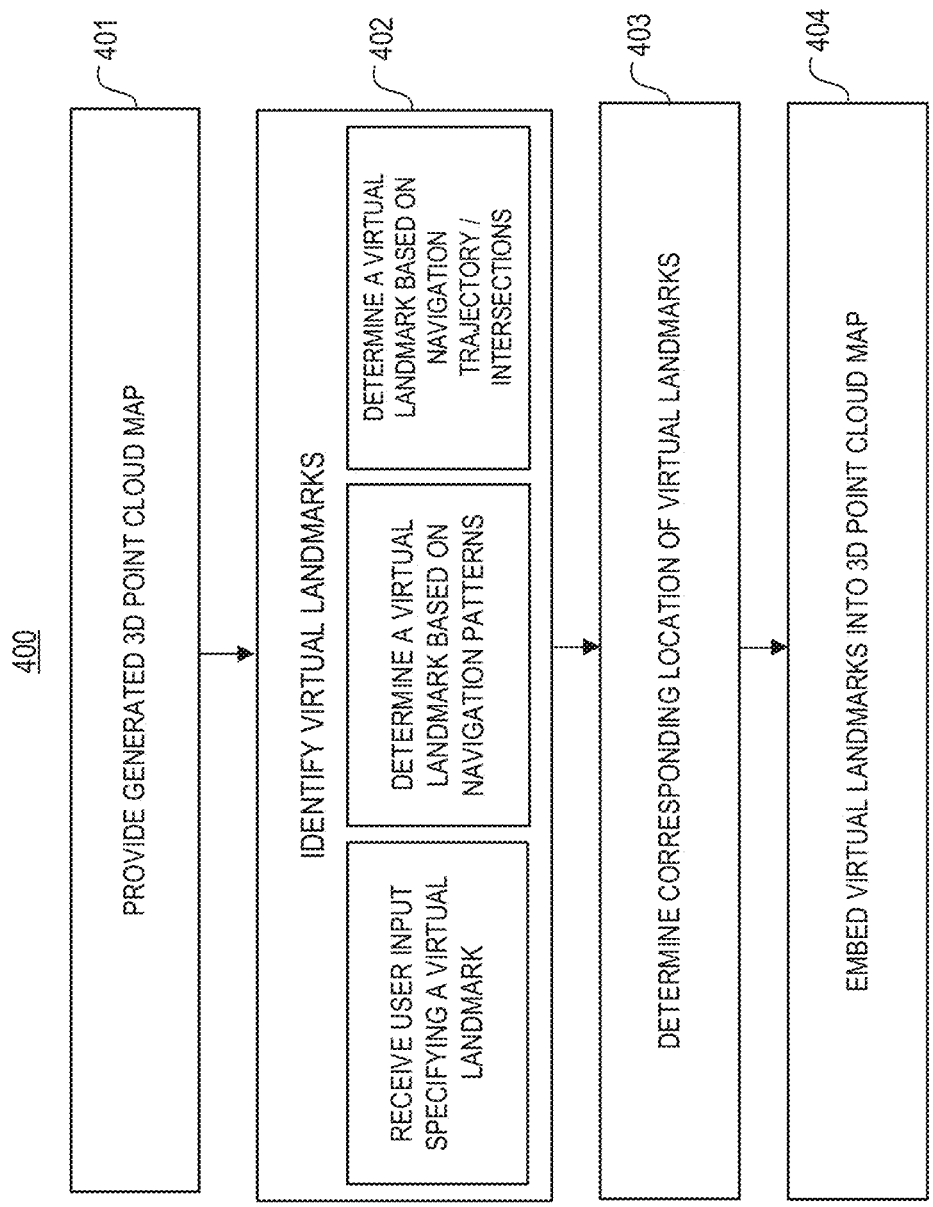
FIG. 4 is a diagram illustrating an example process flow for associating virtual landmarks with the 3D point cloud map according to one or more embodiments of the disclosure.

FIG. 4 is a diagram illustrating an example process flow 400 for associating virtual landmarks with the 3D point cloud map according to one or more embodiments of the disclosure.

Figure 5:
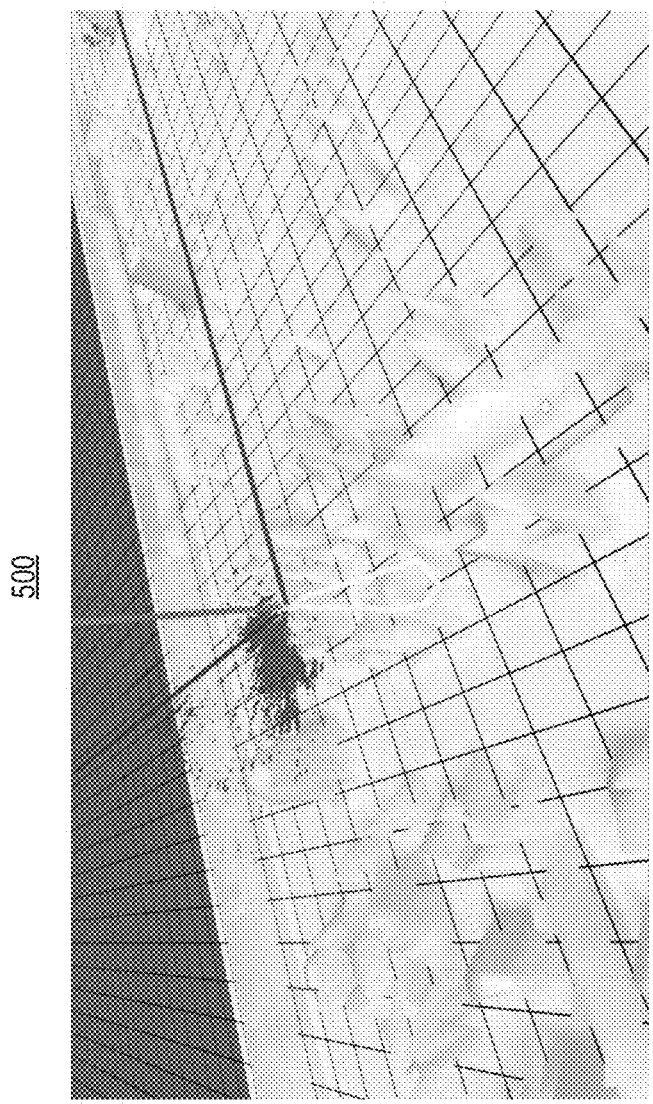
FIG. 5 is a diagram illustrating an example representation of a traffic pattern that may be used to determine a virtual landmark according to one or more embodiments of the disclosure.

In 401, the system may provide or access the generated 3D point cloud map. Using the provided 3D point cloud map, the system may then identify virtual landmarks in 402. These virtual landmarks may be identified by receiving a user indication or automatically by the system. In one aspect, the system may receive user input specifying a virtual landmark. In some embodiments, the user input may include the user specifying a particular point on an image captured by a device at a particular position. For example, the device (e.g. on a display associated with the device) may display a current map or image captured by the device's camera. The user may then identify (e.g. via touchscreen or other input mechanism) a landmark within the image. For example, the landmark may include a physical reference point within the real-word environment (e.g. a permanent structure or element). In some embodiments, the system may determine landmarks based on navigation patterns such as traffic volume. For example, if a large number of robots pass through a particular location in the real world environment, that location may be considered as a candidate for a virtual landmark. In some embodiments, the system may determine a virtual landmark based on trajectory and/or intersection information of a navigation path. For example, navigation trajectories from multiple robots that intersect at a particular location may provide a candidate for a virtual landmark. For example, FIG. 5 is a diagram 500 illustrating an example representation of a traffic pattern that may be used to determine a virtual landmark according to one or more embodiments of the disclosure.

Returning the FIG. 4, in 403, the system may determine a corresponding location of a virtual landmark within the 3D point cloud map. In some embodiments, the system may associate a set of physical coordinates with a set of virtual coordinates. Accordingly, once the location has been determined, the system may associate (e.g. label, embed, reference, etc.) the virtual landmark within the 3D point cloud map.

Figure 6:
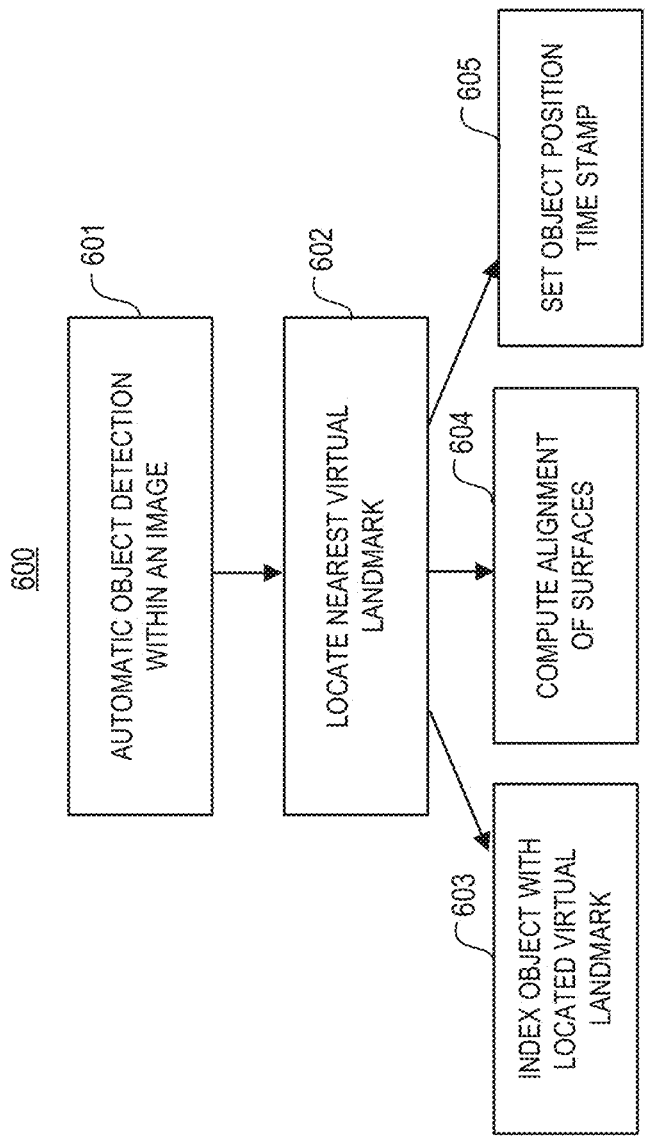
FIG. 6 is a diagram illustrating an example process flow for associating objects with virtual landmarks of a 3D point cloud map according to one or more embodiments of the disclosure.

FIG. 6 is a diagram illustrating an example process flow 600 for associating objects with virtual landmarks of a 3D point cloud map according to one or more embodiments of the disclosure.

In 601, the system may detect an object within a 3D point cloud map. For example, the system may analyze images captured by a device while navigating an environment to detect an object. In some embodiments, object detection may be performed in real-time by the device. For example, an application executing on the device may detect an object within a captured image. Alternatively, or in conjunction with the device, a server may perform the detection of an object. In some embodiments, machine learning mechanisms may be used to identify whether an object exists within an image. In addition, the machine learning mechanism may recognize properties of an object such as surface, shape, color, contextual information, etc. Accordingly, in some instances, the system may even identify or classify a particular object.

Figure 7:
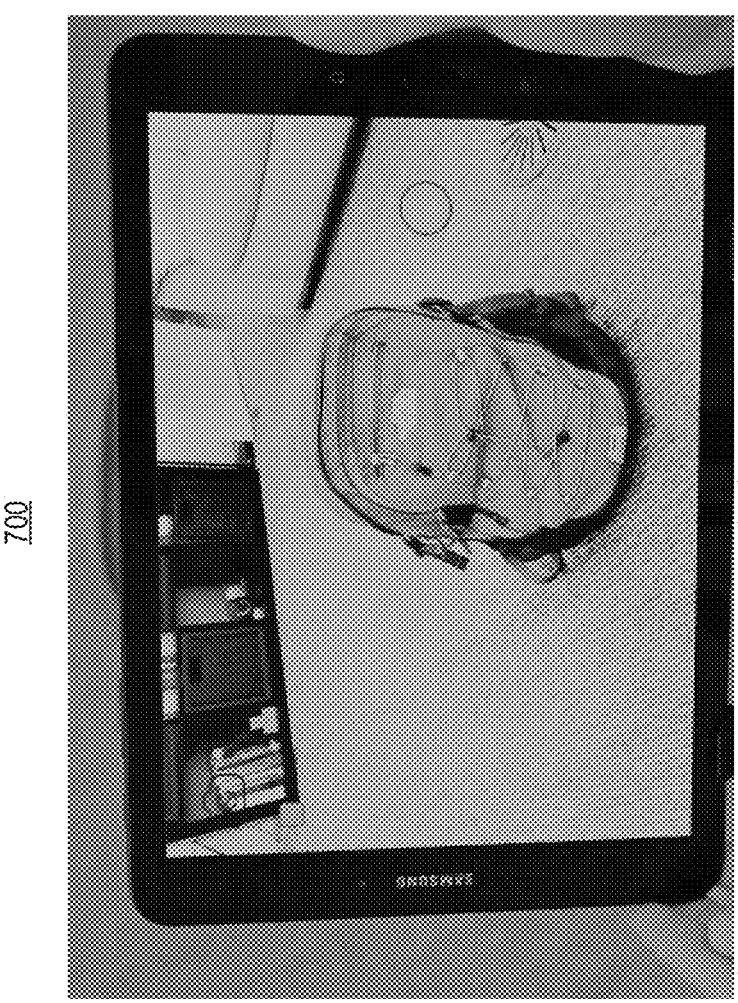
FIG. 7 is an example of a captured image that includes a detected object according to one or more embodiments of the disclosure.

For example, FIG. 7 shows a captured image 700 that includes a detected object according to one or more embodiments of the disclosure. As shown, the system may analyze an image to detect an object, which in this case is a backpack positioned on the floor of the environment. Accordingly, based on characteristics determined within the image, the system may recognize the bag and provide contextual information (e.g. positioned on floor). In addition, the system may determine the permanency of an object. For example, the system may determine a bag is likely to be moved or exist only temporarily at a particular location. Accordingly, such determinations may be used by other devices when updating the 3D point cloud map.

Returning to FIG. 6, in some embodiments, objects may be referenced with respect to a virtual landmark. Accordingly, in 602, the system may locate (or determine) the nearest virtual landmark to a detected object. In 603, the system may then index (or associate, reference, etc.) the object relative to the virtual landmark. For example, location information of the detected object relative to the virtual landmark may be stored (e.g. as actual or relative coordinates). In some embodiments, an object may be indexed with the virtual landmark at the time of object detection. In 604, the system may compute an alignment of surfaces. In 605, the system may set an object position time stamp. For example, the system may monitor the amount of time that has elapsed since the object was detected. Based on the amount of elapsed time, the system may determine the likelihood that an objects still exists at the current location and may update a map accordingly. In some embodiments, virtual landmarks may be navigable positions (e.g. waypoints) within the real world environment and indexing objects with respect to virtual landmarks may provide direct path information for a device to navigate to such an object. Accordingly, based on the relationship between a virtual landmark and an object, a device using the 3D point cloud map may localize these objects within the real world and navigate to these objects, for example, to interact with them.

Figure 8:
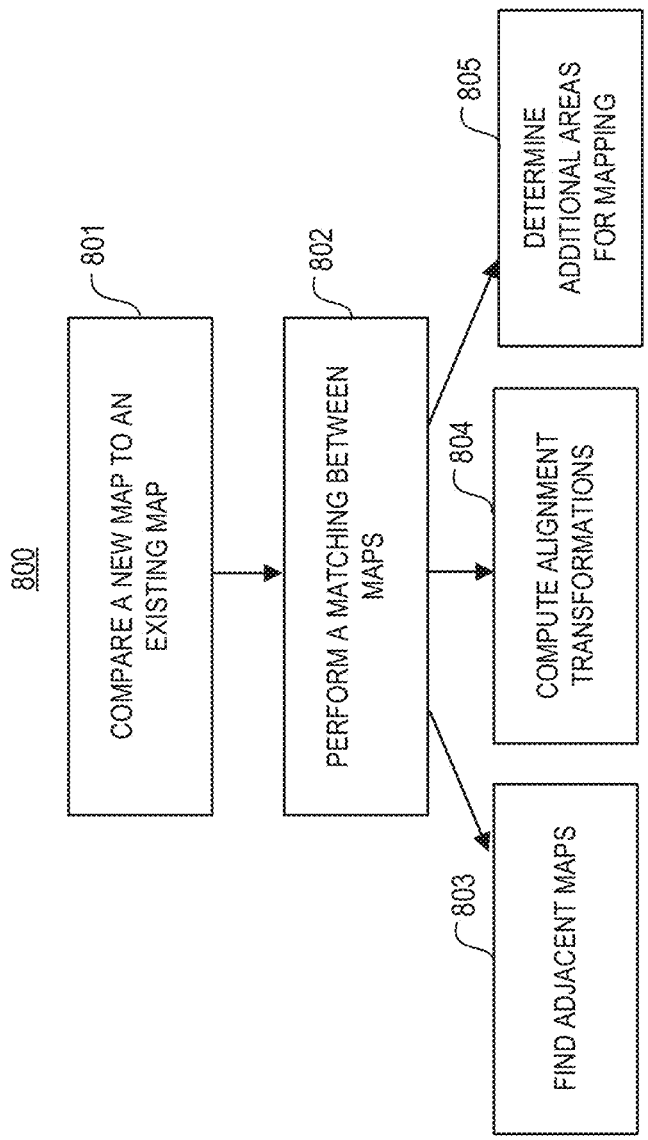
FIG. 8 is a diagram illustrating an example process flow for merging maps according to one or more embodiments of the disclosure.

FIG. 8 is a diagram illustrating an example process flow 800 for merging maps according to one or more embodiments of the disclosure. As described, in some scenarios, multiple devices may generate maps at the same time at different locations. In some embodiments, the various devices may even use different types of sensors (e.g. different camera or sensor types). Accordingly, the system may initiate a process to merge map portions (or fragments, portions, segments, etc.) into a merged (or global, general, etc.) map.

In 801, the system may compare a new map to an existing map. For example, a map provided by a currently navigating device may be compared to an existing map stored in the map database. As another example, maps that are simultaneously provided by two separate devices may also be compared. The system may compare such maps to determine whether they are connected by determining whether the maps cover an overlapping area. For example, connecting such maps may provide the ability to create a larger merged (or global) map.

In 802, the system may perform a matching between maps. In some embodiments, the system may continuously monitor the received video streams and determine real-time whether portions of the generated map overlap. For example, in one embodiment, an overlap detection and/or merging mechanism may execute (or run) as a background process while the system generates maps from multiple video streams. As described, the matching may include comparing keyframes and feature points between maps. In addition, in some embodiments, the system may reference the associated virtual landmarks and or objects to aid in the process of determining whether a match exist between maps. For example, the system may limit the search to a subset of maps based on a nearest virtual landmark. Accordingly, an 803, the system may find adjacent maps based on various criteria and position information. In 804, the system may compute alignment transformations in order to combine maps using an appropriate alignment. In 805, the system may determine (or suggest, or delineate) additional areas for mapping. For example, if the system detects that there any gaps within a general map, or that a particular map is sparse, the system may suggest such an area be marked for potential mapping.

In some embodiments, once 3D point cloud maps are generated (or merged) and various virtual landmarks and objects are associated with the map, the system may reference such virtual landmarks and objects to improve efficiency of the system. For example, the system may reference an identified object to perform an efficient re-localization. In addition, virtual landmarks and objects may be relied upon by a device for navigation purposes.

Figure 9:
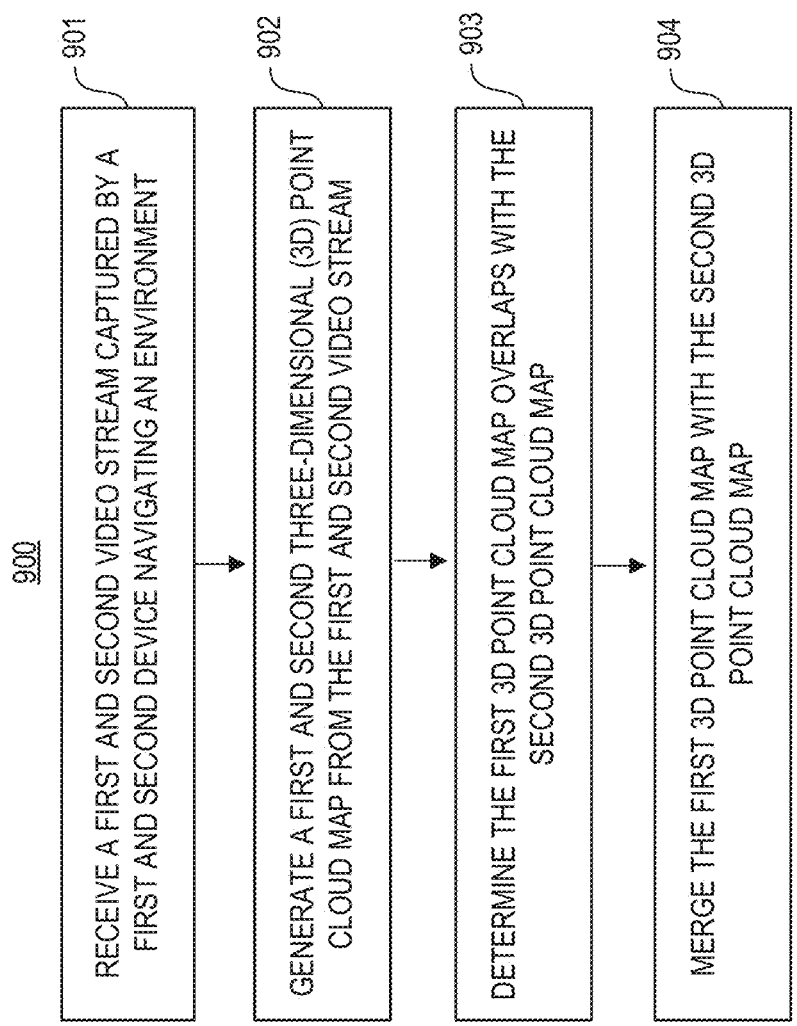
FIG. 9 is a process flow diagram illustrating an example method of managing crowd sourced maps according to one or more embodiments of the disclosure

FIG. 9 is a process flow diagram 900 illustrating an example method of managing crowd sourced maps according to one or more embodiments of the disclosure. Process 900 may use processing logic, which may include software, hardware, or a combination thereof. For example, process 900 may be performed by a system including one or more components described in the operating environment 100 (e.g. server 150).

In 901, the system (e.g. server 150) may receive multiple video streams from multiple devices that are navigating an environment. These video streams may include real-time video streams that may be received concurrently. In one embodiment, the system may receive a first video stream captured by a first device navigating an environment and a second video stream captured by a second device navigating the environment. As noted, the second device may be different from the first device, and may even be a different type of device. For example, the first device may be a robotic device (e.g. a robotic vacuum) and the second device may a handheld device such as a tablet or smartphone that is used by a user to capture the environment.

In 902, the system may process the multiple video streams. As described, the system may implement a simultaneous localization and mapping (SLAM) technique (e.g. algorithm) to process the video streams. In one embodiment, the system may process the first video stream and the second video stream. In some embodiments, the first and second video streams may be received concurrently, and accordingly, the system may simultaneously process each video stream. The processing may include generating a first three-dimensional (3D) point cloud map from the first video stream and a second three-dimensional (3D) point cloud map from the second video stream.

In some embodiments, processing the first video stream and the second video stream may include generating at least portions of the first 3D point cloud map and the second 3D point cloud map simultaneously. In addition, in some embodiments, the processing may further include performing a re-localization for the first device using key frames of the first video stream and for the second device using key frames of the second video stream. In addition, in some embodiments, the system may localize the first device using a triangulation calculation that includes one or more virtual landmarks. In some embodiments, the system may also calibrate a device to align the 3D point cloud map with the environment by performing one or more movements of the first device along one or more axes within a three-dimensional space. These movements may include rotations and/or translations of the first device.

In 903, the system may determine the first 3D point cloud map overlaps with the second 3D point cloud map. When determining whether there exists an overlap between maps, the system may use a loop closing algorithm to analyze key frames. Accordingly, in one embodiment, determining the first 3D point cloud map overlaps with the second 3D point cloud map may include detecting a first set of key frames within the first video stream matches a second set of key frames within the second video stream.

In some embodiments, the system may detect an object within one or more images or sensor data maps captured by the first device, and index the object based on a position relative to the identified landmark. Accordingly, the system may perform a re-localization for the first device by referencing key frames within a vicinity of the virtual landmark or the object.

As described, the system may also identify virtual landmarks. In some embodiments, the system may identify a location captured by the first device within the environment as a virtual landmark. Accordingly, the system may associate a physical location in the environment with a location within the first 3D point cloud map, for the virtual landmark. In addition, in some embodiments, the system may identify an object captured by the first device within the environment and index the object based on a position relative to one or more virtual landmarks. In some embodiments, the system may also associate the first 3D point cloud map with the environment by associating a physical location of the environment with a location within the 3D point cloud map to create a virtual coordinate. For example, associating the physical location of the environment with the 3D point cloud location may include receiving, from a user interface associated with the first device, a user input specifying the location when the user touches on the user interface.

In 904, the system may merge the first 3D point cloud map with the second 3D point cloud map in response to determining the first 3D point cloud map overlaps with the second 3D point cloud map. In some embodiments, merging a first portion of the first 3D point cloud map with a second portion of the second 3D point cloud map may be based on position information associated with the first set of key frames and the second set of key frames.

As described, the merged map may be reused by various devices. For example, the system may provide the map to specific devices based on a device identifier (or device ID). In some embodiments, the system may receive a request for a 3D point cloud map from a third device, and the system may provide the merged 3D point cloud map to the third device in response to determining a device identifier of the third device is associated with the merged 3D point cloud map. For example, the device identifier may indicate the third device is a similar type of device (e.g. robot) as the first and/or second device, and accordingly, the third device may utilize (or reuse) the merged map. In addition, in some embodiments, the system may receive, from the first device, information specifying a first navigation waypoint for the first device, and share, with the third device, the first navigation waypoint as part of providing the merged 3D point cloud map to the third device.

It should be noted that the operations described in various processes are not necessarily performed in the order indicated and may be performed in parallel. In addition, described operations may be combined and what may be described as a single operation may be implemented in multiple operations.

Figure 10:
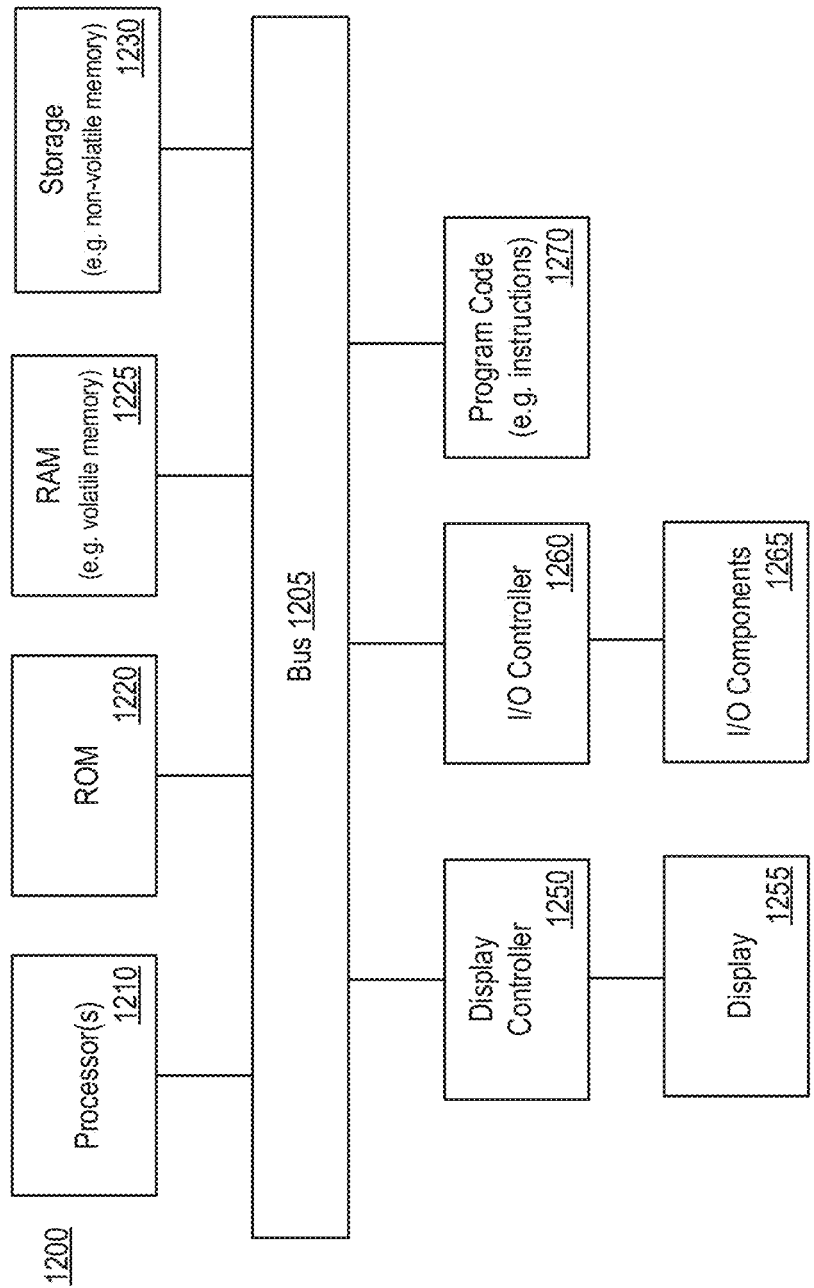
FIG. 10 is a block diagram illustrating an example of a computing system that may be used in conjunction with one or more embodiments of the disclosure.

FIG. 10 shows a block diagram of an example of a computing system that may be used in conjunction with one or more embodiments of the disclosure. For example, computing system 1200 (or system, or server, or computing device, or device) may represent any of the devices or systems (e.g. device 110, server 150) described herein that perform any of the processes, operations, or methods of the disclosure. As referred to herein, a system, for example, with reference to the claims, may include one or more computing systems that may include one or more processors. Note that while the computing system 1200 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1200 may include a bus 1205 which may be coupled to processor(s) 1210, ROM (Read Only Memory) 1220, RAM (or volatile memory) 1225, and storage (or non-volatile memory) 1230. The one or more processors 1210 may retrieve stored instructions from one or more of the memories 1220, 1225, and 1230 and execute the instructions to perform processes, operations, or methods described herein. These memories represent examples of a non-transitory computer-readable medium (or processor-readable medium, machine-readable medium, a computer program product, etc.) containing a program (or instructions, or program code, etc.) which when executed by a processor (or system, device, etc.), may cause the processor to perform operations, processes, or methods described herein. As referred to herein, for example, with reference to the claims, a processor may include one or more processors.

The RAM 1225 may be implemented as, for example, dynamic RAM (DRAM), or other types of memory that require power continually in order to refresh or maintain the data in the memory. Storage 1230 may include, for example, magnetic, semiconductor, tape, optical, removable, non-removable, and other types of storage that maintain data even after power is removed from the system. It should be appreciated that storage 1230 may be remote from the system (e.g. accessible via a network).

A display controller 1250 may be coupled to the bus 1205 in order to receive display data to be displayed on a display device 1255, which can display any one of the user interface features or embodiments described herein and may be a local or a remote display device. The computing system 1200 may also include one or more input/output (I/O) components 1265 including mice, keyboards, touch screen, network interfaces, printers, speakers, and other devices. Typically, the input/output components 1265 are coupled to the system through an input/output controller 1260.

Program code (or a program) 1270 may represent any of the instructions, applications, software, libraries, toolkits, modules, components, engines, units, functions, logic, etc. as described herein. Program code 1270 may reside, completely or at least partially, within the memories described herein (e.g. non-transitory computer-readable media), or within a processor during execution thereof by the computing system. Program code 1270 may include both machine code, such as produced by a compiler, and files containing higher-level or intermediate code that may be executed by a computing system or other data processing apparatus (or machine) using an interpreter. In addition, program code 1270 can be implemented as software, firmware, or functional circuitry within the computing system, or as combinations thereof. Program code 1270 may also be downloaded, in whole or in part, through the use of a software development kit or toolkit that enables the creation and embodiment of the described embodiments.

Moreover, such one or more processors 1210 may perform operations in a "cloud computing" environment or as a service (e.g. within a "software as a service" (SaaS) implementation). Accordingly, the performance of operations may be distributed among the one or more processors 1210, whether residing only within a single machine or deployed across a number of machines. For example, the one or more processors 1210 may be located in a single geographic location (e.g. within a home environment, an office environment, or a server farm), or may be distributed across a number of geographic locations.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that the term "approximately" or "substantially" may be used herein and may be interpreted as "as nearly as practicable," "within technical limitations," and the like. In addition, the use of the term "or" indicates an inclusive or (e.g., and/or) unless otherwise specified.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A method comprising:
receiving, by a computing system, a first input signal captured by a first device navigating an environment and a second input signal captured by a second device navigating the environment, wherein the first and second devices are configured to move independently from each other and along separate paths in the environment;
generating, by the computing system, a first three-dimensional (3D) point cloud map from the first input signal and a second 3D point cloud map from the second input signal, wherein at least portions of the first 3D point cloud map and the second 3D point cloud map are generated concurrently with an execution of a loop closing process;
determining, by the computing system, that the first 3D point cloud map overlaps with the second 3D point cloud map; and
merging, by the computing system, the first 3D point cloud map with the second 3D point cloud map in response to determining that the first 3D point cloud map overlaps with the second 3D point cloud map.

2. The method of claim 1, further comprising:
calibrating the first device to align the first 3D point cloud map with the environment by performing one or more movements of the first device along one or more axes within a three-dimensional space.

3. The method of claim 1, wherein determining that the first 3D point cloud map overlaps with the second 3D point cloud map includes:
detecting a first set of key frames within the first input signal that matches a second set of key frames within the second input signal as part of the loop closing process.

4. The method of claim 3, wherein merging the first 3D point cloud map with the second 3D point cloud map includes:
merging a first portion of the first 3D point cloud map with a second portion of the second 3D point cloud map based on position information associated with the first set of key frames and the second set of key frames.

5. The method of claim 1, further comprising:
identifying a location captured by the first device within the environment as a virtual landmark; and
associating a physical location in the environment with a map location within the first 3D point cloud map for the virtual landmark.

6. The method of claim 5, further comprising:
localizing the first device using a triangulation calculation including at least the virtual landmark.

7. The method of claim 5, further comprising:
identifying an object captured by the first device within the environment; and
indexing the object based on a position relative to the virtual landmark.

8. The method of claim 1, further comprising:
associating the first 3D point cloud map with the environment by associating a physical location of the environment with a map location within the first 3D point cloud map to create a virtual coordinate.

9. The method of claim 8, wherein associating the physical location of the environment with the map location within the first 3D point cloud map includes:
receiving, from a user interface associated with the first device, a user input specifying the physical location when a user touches on the user interface.

10. The method of claim 1, further comprising:
receiving a request for a 3D point cloud map from a third device; and
providing a merged 3D point cloud map, formed from the merging of the first 3D point cloud map with the second 3D point cloud map, to the third device in response to determining that a device identifier of the third device is associated with the merged 3D point cloud map.

11. The method of claim 1, further comprising:
receiving, from the first device, information specifying a first navigation waypoint for the first device; and
sharing, with a third device, the first navigation waypoint as part of providing a merged 3D point cloud map, formed from the merging of the first 3D point cloud map with the second 3D point cloud map, to the third device.

12. The method of claim 1, wherein the execution of the loop closing process comprises performance of a loop closing algorithm to determine at least one of:
whether the first device or the second device has already traversed a particular area in the environment; and
whether one of the first device and the second device has traversed an area in the environment previously traversed by another of the first device and the second device.

13. A computer program product comprising a non-transitory computer-readable medium having computer-readable program code embodied therein to be executed by one or more processors, the program code including instructions to:
receive a first input signal captured by a first device navigating an environment and a second input signal captured by a second device navigating the environment, wherein the first and second devices are configured to move independently from each other and along separate paths in the environment;
generate a first three-dimensional (3D) point cloud map from the first input signal and a second 3D point cloud map from the second input signal, wherein at least portions of the first 3D point cloud map and the second 3D point cloud map are generated concurrently with an execution of a loop closing process;
determine that the first 3D point cloud map overlaps with the second 3D point cloud map; and
merge the first 3D point cloud map with the second 3D point cloud map in response to determining that the first 3D point cloud map overlaps with the second 3D point cloud map.

14. The computer program product of claim 13, the program code including further instructions to:
identify a location captured by the first device within the environment as a virtual landmark; and
associate a physical location in the environment with a map location within the first 3D point cloud map for the virtual landmark.

15. The computer program product of claim 14, the program code including further instructions to:
localize the first device using a triangulation calculation including at least the virtual landmark.

16. The computer program product of claim 14, the program code including further instructions to:
identify an object captured by the first device within the environment; and
index the object based on a position relative to the virtual landmark.

17. The computer program product of claim 16, the program code including further instructions to:

receive, from a user interface associated with the first device, a user input specifying the physical location when a user touches on the user interface.

18. A system comprising:

one or more processors; and a non-transitory processor-readable medium storing a plurality of instructions, which when executed, cause the one or more processors to:

receive a first input signal captured by a first device navigating an environment and a second input signal captured by a second device navigating the environment, wherein the first and second devices are configured to move independently from each other and along separate paths in the environment;

generate a first three-dimensional (3D) point cloud map from the first input signal and a second 3D point cloud map from the second input signal, wherein at least portions of the first 3D point cloud map and the second 3D point cloud map are generated concurrently with an execution of a loop closing process;

determine that the first 3D point cloud map overlaps with the second 3D point cloud map; and merge the first 3D point cloud map with the second 3D point cloud map in response to determining that the first 3D point cloud map overlaps with the second 3D point cloud map.

19. The system of claim 18, wherein the plurality of instructions, when executed, further cause the one or more processors to:

identify a location captured by the first device within the environment as a virtual landmark; and associate a physical location in the environment with a map location within the first 3D point cloud map for the virtual landmark.

20. The system of claim 19, wherein the plurality of instructions, when executed, further cause the one or more processors to:

identify an object captured by the first device within the environment; and index the object based on a position relative to the virtual landmark.

* * * * *